US012508206B1

(12) United States Patent
Wu et al.

(10) Patent No.: US 12,508,206 B1
(45) Date of Patent: Dec. 30, 2025

(54) MEDICAL DEVICE FOR PREPARATION OF A MEDICAMENT

(71) Applicant: Genzyme Corporation, Cambridge, MA (US)

(72) Inventors: Haiming Wu, Weston, MA (US); Eric Raymond Schiller, Cambridge, MA (US); Martin Michael Coyne, III, Boonton, NJ (US); Katherine Ford Brigham, Boonton, NJ (US)

(73) Assignee: Genzyme Corporation, Cambridge, MA (US)

(*) Notice: Subject to any disclaimer, the term of this patent is extended or adjusted under 35 U.S.C. 154(b) by 0 days.

(21) Appl. No.: 18/960,437

(22) Filed: Nov. 26, 2024

(51) Int. Cl.

| | |
|---|---|
| ***A61J 1/14*** | (2023.01) |
| ***A61J 1/06*** | (2006.01) |
| ***A61J 1/12*** | (2006.01) |
| ***A61J 1/20*** | (2006.01) |
| ***A61M 31/00*** | (2006.01) |

(52) U.S. Cl.
CPC ................ *A61J 1/062* (2013.01); *A61J 1/12* (2013.01); *A61J 1/2055* (2015.05); *A61J 1/2089* (2013.01)

(58) Field of Classification Search
CPC .. A61J 1/062; A61J 1/12; A61J 1/2055; A61J 1/2089; A61J 1/00; A61J 1/065; A61J 1/1406; A61J 1/201; A61J 1/2093; A61J 1/10; A61J 1/2013; A61J 1/05-067; A61J 7/0069; A61J 1/16; A61J 1/2096; B65D 75/527; B65D 81/3294; B65D 2577/2083; B65D 2577/2091; B65D 81/32; B65D 75/28; B65D 75/36; B65D 75/32; A61M 2209/06; A61M 5/19; A61M 5/1782; B65B 29/10; B65B 3/022; B65B 5/04; B05C 5/02
See application file for complete search history.

(56) References Cited

U.S. PATENT DOCUMENTS 6,021,824 A * 2/2000 Larsen .................. A61J 1/2089 141/59
6,024,221 A * 2/2000 Yuyama .................... A61J 1/00 206/538
6,364,865 B1 * 4/2002 Lavi .................... A61M 5/2448 604/411

(Continued)

OTHER PUBLICATIONS

Needle-based injection systems for medical use requirements and test methods, Part 1: Needle injection systems, ISO 11608 1:2014(E), Third Edition, Switzerland, ISO, Dec. 15, 2014, pp. 1-13.

*Primary Examiner* — Philip R Wiest
*Assistant Examiner* — Brandon W. Levy
(74) *Attorney, Agent, or Firm* — Fish & Richardson P.C.

(57) ABSTRACT

A medical device for use in the preparation of a medicament comprising a tray movable from a first configuration to a second configuration and comprising a first tray portion and a second tray portion. The first tray portion comprises a first retainer to retain a first medicament vial and the second tray portion comprises a second retainer configured to retain a second medicament vial. The first tray portion is pivotable relative to the second tray portion to move the tray from the first configuration to the second configuration. The tray is configured such that the first medicament constituent and the second medicament constituent can be accessed by a user.

17 Claims, 6 Drawing Sheets

(56) References Cited

U.S. PATENT DOCUMENTS

| | | | | |
|---|---|---|---|---|
| 8,151,984 | B2 * | 4/2012 | Braeder | B65D 81/3294 206/568 |
| 2004/0093891 | A1 * | 5/2004 | Keeter | F25D 3/08 62/457.2 |
| 2013/0331810 | A1 * | 12/2013 | Bazala | A61J 1/2096 220/737 |
| 2015/0025456 | A1 * | 1/2015 | Shetty | A61M 5/31501 604/91 |
| 2015/0209790 | A1 * | 7/2015 | Sharpe | A61J 1/16 422/562 |
| 2017/0157379 | A1 * | 6/2017 | Boyajian | A61J 1/2089 |
| 2023/0382583 | A1 * | 11/2023 | Bretz | B65D 85/182 |

* cited by examiner

MEDICAL DEVICE FOR PREPARATION OF A MEDICAMENT

TECHNICAL FIELD

This application relates to a medical device for the preparation of a medicament, for example to assist with the preparation of a medicament from medicament constituents contained in two medicament vials. This application also relates to a kit comprising the medical device, and a method of using the medical device.

BACKGROUND

Providing intravenous (IV) therapy at a patient's home rather than at a traditional healthcare setting such as an IV infusion clinic may offer significant benefits for both the patient and for healthcare systems. IV infusion clinic visits can be frequent and extensive. Some patients may cite the expense and inconvenience of in-clinic treatment as a significant barrier to therapy and may prefer to receive therapy in their home. Delivery of IV therapies at home can provide patients with autonomy and improved convenience, and may decrease burden on the overall healthcare system.

Some medicaments for IV infusion may be provided in a pre-prepared (e.g., pre-mixed) form and may be prefilled in a final reservoir such as a flexible IV container, ready for IV administration by a user. However, in some instances, for reasons such as medicament stability, a medicament may instead need to be prepared immediately prior to infusion and may therefore be provided as two or more medicament constituents that must be combined to produce the final medicament for administration. As an example, a lyophilized drug in a medicament vial may need to be reconstituted using a liquid contained in a different medicament vial to produce a final medicament for IV delivery.

In a clinic setting, medicament preparation may be performed by highly competent, trained clinicians (typically such as pharmacists, pharmacy technicians, or nurses). In such a clinic setting, extensive procedures for medicament preparation can exist to ensure the preparation of sterile and stable medicaments. Nevertheless, such preparation may be time consuming and still subject to human error. In a home setting, such extensive procedures for preparing a sterile and stable medicament may not be in place. Patients (or their potentially non-clinician caregiver) may in some instances be tasked with performing some or all of the medicament preparation themselves, wherein the patient may have little or no previous experience of doing so. Alternatively, the patient may require the support of a healthcare professional such as a traveling nurse to visit the home and assist with each preparation and/or administration. Regardless of the user's professional title, training or preparation experience, the home environment may lack the medicament preparation infrastructure inherent to in-clinic preparations, including a sterile, well-lit preparation environment (e.g., a laminar flow hood) and bulk preparation supplies (e.g., syringes, needles, gloves), One or more of these factors may reduce the overall benefit of home infusion for certain medications.

There may be a desire for improvements in the preparation of medicaments, for example in the preparation of a medicament from medicament constituents that are provided in two medicament vials.

SUMMARY

According to a first aspect of the present disclosure, there is provided medical device for use in the preparation of a medicament, the medical device comprising:

- a tray movable from a first configuration to a second configuration and comprising a first tray portion and a second tray portion,
- wherein the first tray portion comprises a first retainer configured to retain a first medicament vial containing a first medicament constituent,
- wherein the second tray portion comprises a second retainer configured to retain a second medicament vial containing a second medicament constituent,
- wherein the first tray portion and the second tray portion are pivotably coupled such that the first tray portion is pivotable relative to the second tray portion to move the tray from the first configuration to the second configuration, and
- wherein the tray is configured such that, when the first medicament vial and second medicament vial are retained in the respective first retainer and second retainer, the first medicament constituent and the second medicament constituent can be accessed by a user.

The tray may be configured such that, when the tray is in the first configuration and the first medicament vial and second medicament vial are retained in the respective first retainer and second retainer, a longitudinal axis of the first medicament vial is substantially parallel to a longitudinal axis of the second medicament vial.

When the first medicament vial is retained in the first retainer and the second medicament vial is retained in the second retainer, the first tray portion may be configured to pivot relative to the second tray portion about an axis that is substantially perpendicular to a longitudinal axis of the first medicament vial and a longitudinal axis of the second medicament vial.

The first tray portion and the second tray portion may be configured such that a stopper of the first medicament vial and a stopper of the second medicament vial can be accessed when: the tray is in the second configuration, the first medicament vial is retained in the first retainer and the second medicament vial is retained in the second retainer.

The first tray portion and the second tray portion may each comprise a respective end surface arranged such that, when the tray is in the second configuration, the end surfaces are substantially coplanar for supporting the tray.

The tray may further comprise a coupling arrangement configured to retain the tray in the second configuration.

The coupling arrangement may comprise a first coupling element arranged at the first tray portion and a second coupling element arranged at the second tray portion, the first coupling element and the second coupling element couplable to retain the tray in the second configuration.

The first retainer may be configured to retain the first vial through a friction fit or a snap fit.

The first retainer may comprise a recess formed in the first tray portion that is configured to receive a portion of the first medicament vial, and wherein the second retainer comprises a recess formed in the second tray portion that is configured to receive a portion of the second medicament vial.

The first retainer may comprise a collar configured to receive at least a portion of the first medicament vial to retain the first medicament vial.

The first retainer may further comprise a retention element configured to receive a neck portion of the first medicament vial.

The first retainer may further comprise at least one flexible engagement element extending from the collar and configured to engage with the first medicament vial to retain the first medicament vial within the collar.

The first tray portion and the second tray portion may be pivotably coupled by a hinge portion.

The first tray portion, the second tray portion and the hinge portion may be integrally formed.

The hinge portion may comprise a linear perforation.

According to a second aspect of the present disclosure, there is provided a kit comprising a medical device as disclosed herein, a first medicament vial configured to be retained in a first retainer of the medical device, and a second medicament vial configured to be retained in a second retainer of the medical device.

At least one of the first medicament vial and the second medicament vial may contain a medicament constituent.

According to a third aspect of the present disclosure, there is provided a method comprising:

moving the tray of a medical device disclosed herein from its first configuration to its second configuration.

The method may further comprise, while the tray is in the second configuration:

extracting a first medicament constituent from a first medicament vial retained in the first retainer; and introducing the first medicament constituent extracted from the first medicament container into a second medicament vial retained in the second retainer.

The method may further comprise:

inserting a first medicament vial into the first retainer; and inserting a second medicament vial into the second retainer.

BRIEF DESCRIPTION OF THE FIGURES

Exemplary embodiments of the present disclosure are described with reference to the accompanying drawings, in which.

DETAILED DESCRIPTION

A medical device, as described herein, may be used to assist in the preparation of a medicament, for example prior to intravenous administration of the medicament to a patient.

According to one or more aspects of the present disclosure, the medical device may be used to retain a plurality of medicament vials that each may contain a constituent of the medicament to be prepared. The medicament vials may be held by the medicament device while the medicament is prepared using the medicament constituents contained in the medicament vials. As a non-limiting example, the medical device may be used to position and retain a first medicament vial containing a first medicament constituent and a second medicament vial containing a second medicament constituent during a process of mixing the first and second medicament constituents to produce a medicament.

According to one or more aspects of the present disclosure, the medical device can assist in the pairing of the correct medicament vials required to prepare a medicament. For example, the medical device can assist with pairing a first medicament vial containing a drug product with a second medicament vial containing an appropriate diluent for diluting the drug product. As a non-limiting example, the drug product may comprise a lyophilized drug product (e.g., for a reconstitution process) and the diluent may be a liquid drug product (e.g., for a dilution process).

One or more devices or methods disclosed herein may assist with reducing or mitigating user errors during a process of preparing and/or dispensing a medicament using medicament vials. In some examples, the medical device can assist a user in gathering the correct medicament vials and medicament constituents necessary for a particular medicament, and/or can be used to store or organize the medicament vials. This ability to organize and pair medicament vials may be particularly advantageous for situations in which a large number of medicament vials must be used per dose of medicament to be administered, and/or in situations in which a patient is sent a large number of medicament vials from a pharmacy to their home to provide the patient with sufficient doses for an extended period of time. Aspects of the present disclosure may allow a pharmacy and/or patient to easily ensure there are no missing components when preparing a medicament.

During manual manipulations performed during the preparation of a medicament, the medical device may serve as an ergonomic support for the medicament vials during the preparation. Pairing medicament vials in the medical device may help a user know which medicament vials are to be used together during the preparation, and may reduce errors during repetitive reconstitution or dilution steps, for example. Use of the medical device may serve to discourage users from re-accessing medicament vials for multiple preparation manipulations, which may reduce the risk of microbial contamination.

Figure 1:
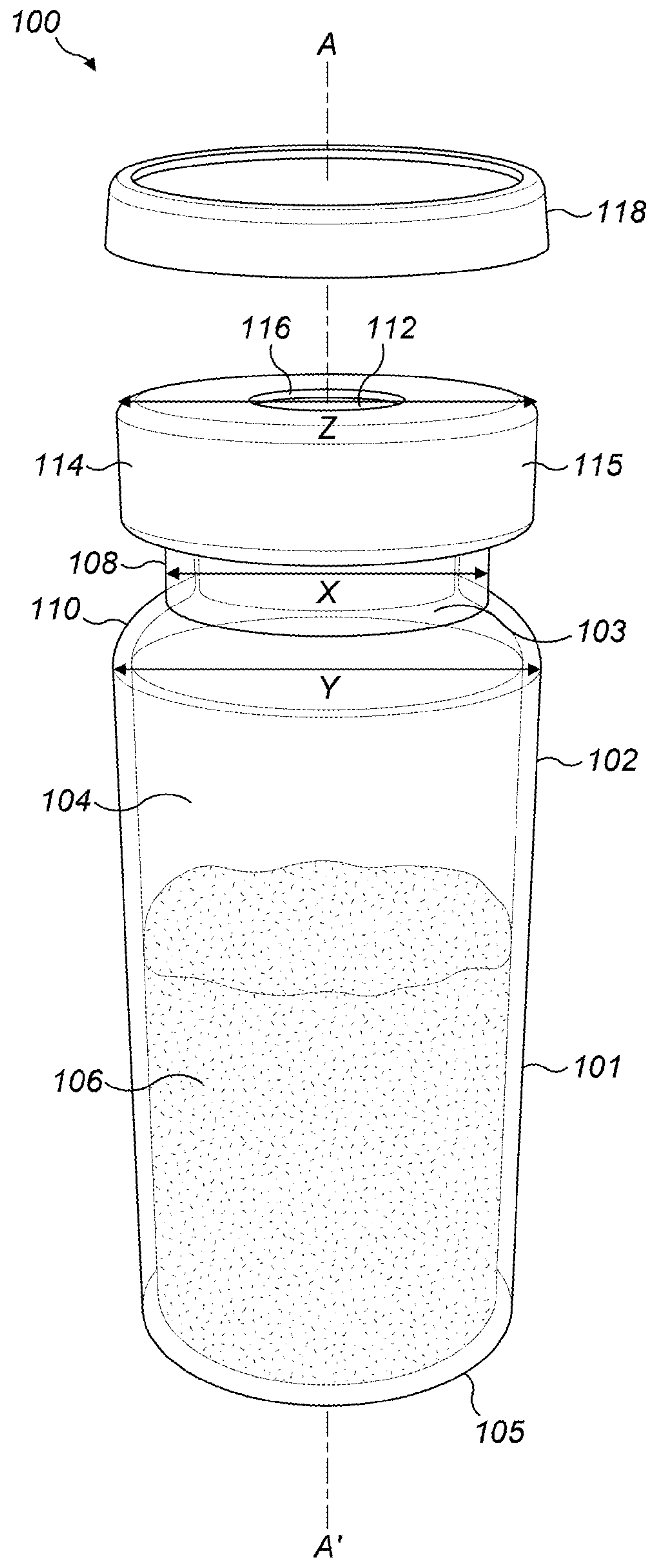
FIG. 1 shows a perspective view of a medicament vial suitable for use in one or more embodiments of the present disclosure.

FIG. 1 shows an example of a medicament vial 100 which may be used with one or more embodiments of the present disclosure.

The medicament vial 100 comprises a cylindrical body 102 extending along a longitudinal axis A-A' and containing a reservoir 104 for holding a medicament 106 or medicament constituent within. The body 102 has a circumferential outer surface 101 and a substantially flat end surface 105. An outlet 103 is arranged at an opposite end of the body 102 to the end surface 105. The outlet 103 is in fluid communication with the reservoir 104 such that the medicament 106 may be extracted from the reservoir 104 via the outlet 103. FIG. 1 shows the outlet 103 being formed from a neck portion 108 of the medicament vial 100 that is coupled to the body 102 by a shoulder portion 110 of the vial 100, wherein the neck portion 108 extends along the longitudinal axis A-A' and has a diameter X perpendicular to the axis A-A' that is less than a diameter Y of the body 102 perpendicular to the axis A-A' and adjacent the neck portion 108.

A stopper 112 is located within the neck portion 108 to seal the outlet 103 and inhibit the medicament 106 from leaving the medicament vial 100. The stopper 112 may be formed from a polymer such as natural or synthetic rubber, a thermoplastic elastomer, or silicone. The stopper 112 is configured to be pierced by a hollow needle to bring the reservoir 104 into fluid communication with the outside of the medicament vial 100, via the hollow needle, thereby allowing the medicament 106 to be extracted from the reservoir 104 via the hollow needle and/or allowing a further medicament constituent to be introduced into the reservoir 104 via the hollow needle.

A circular flange 114 extends radially from the neck portion 108, at an opposite end of the neck portion 108 to the end coupled to the body 102, the flange 114 having a diameter Z perpendicular to the axis A-A' that is greater than the diameter X of the neck portion 108 perpendicular to the axis A-A'. A crimp cap 115 may be arranged to at least partially surround the flange 114 such that the stopper 112 is retained in the neck portion 108. The crimp cap 115 has an aperture 116 to allow access to the stopper 112 by a hollow needle. The crimp cap 115 may be formed from a flexible material such as aluminium, but other suitable materials may be used instead.

The medicament vial 100 may further comprise a vial cap 118 configured to cover the aperture 116 of the crimp cap 115 such that access to the stopper 112 via the aperture 116 is inhibited. The vial cap 118 may be coupled to the flange 114 or the stopper 112, and may be removed from the remainder of the medicament vial 100 to uncover the aperture 116 prior to use of the medicament 106. To remove the vial cap 118, a user may pull the vial cap 118 off the flange 114 or stopper 112, which may snap a connector that connected the vial cap 118 to the flange 114 or stopper 112. FIG. 1 shows the vial cap 118 after it has been uncoupled from the remainder of the medicament vial 100.

In some instances, the medicament 106 or medicament constituent within the vial 100 may be a liquid medicament or liquid medicament constituent, such as a diluent. In other instances, the medicament 106 may be a solid medicament or solid medicament constituent, such as a powdered medicament or medicament constituent or a crystallised medicament or medicament constituent. In some examples, the solid medicament or solid medicament constituent may comprise a lyophilized drug.

Some medicaments require preparation from their one or more medicament constituents shortly prior to administration (e.g., IV administration) of the medicament. For example, in some instances, a solid medicament constituent contained in a first medicament vial may be provided in a lyophilized form and require reconstitution using a liquid medicament constituent such as a diluent provided in a second medicament vial, whereby the lyophilized medicament constituent is dissolved into the suitable diluent to produce the required medicament. In other examples, a first liquid medicament constituent provided in a first medicament vial may require dilution using a second liquid medicament constituent provided in a second medicament vial. However, issues can arise during the process of preparing a medicament from its constituent parts. For example, there may be complications when transferring a diluent from one medicament vial to a second medicament vial containing a lyophilized drug, or during mixing of two medicament constituents in a medicament vial.

Figure 2A:
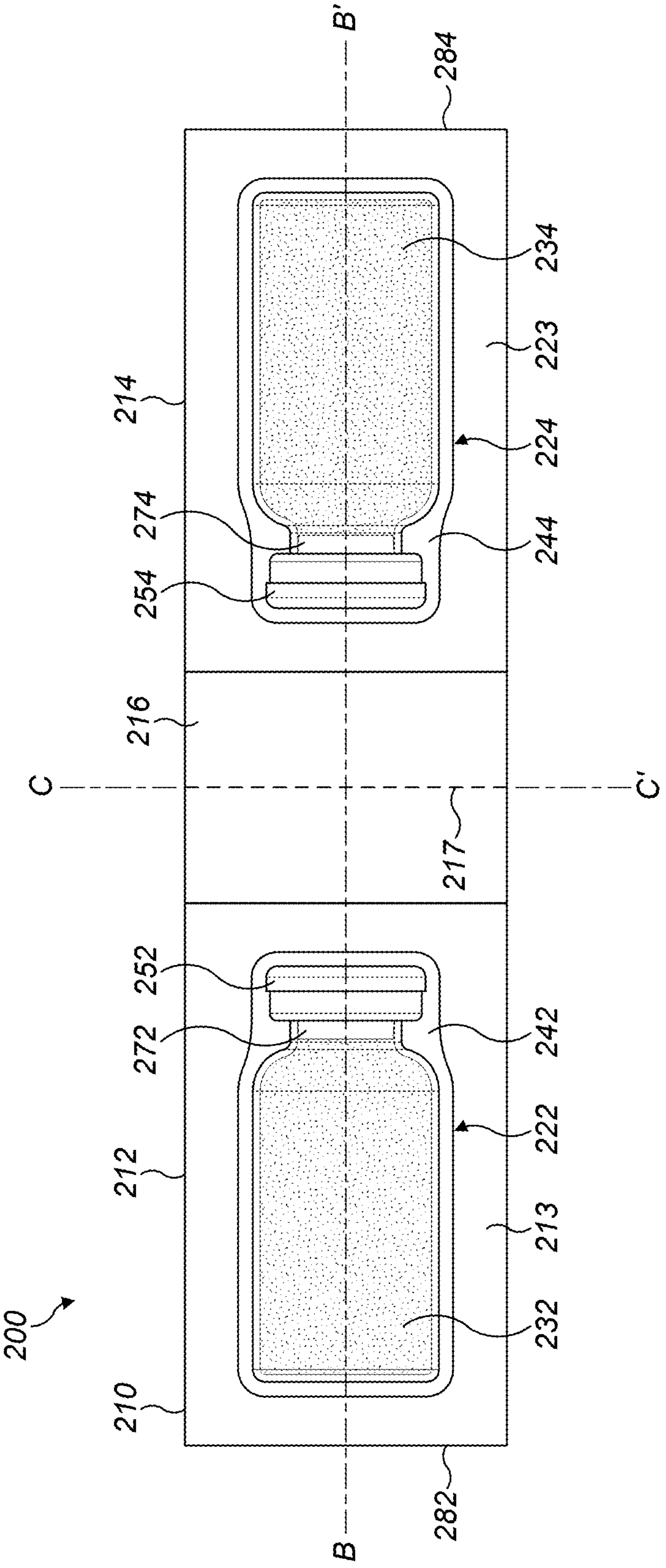
FIG. 2A shows a top view of a medical device according to one or more embodiments of the present disclosure, wherein the medical device is in a first configuration.
Figure 2B:
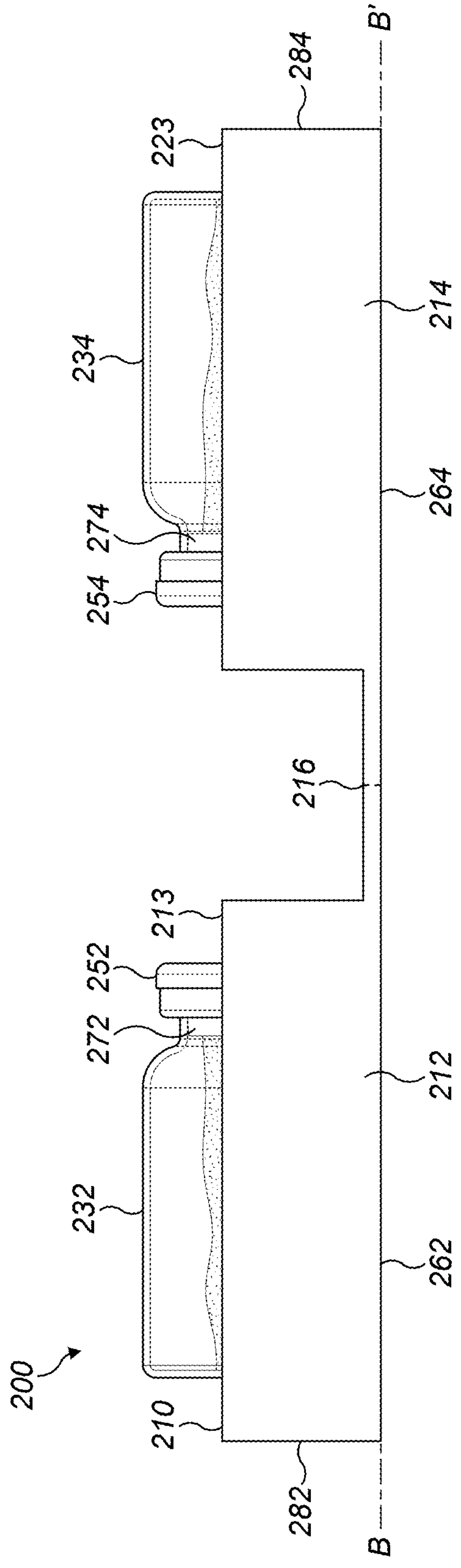
FIG. 2B shows a side view of the medical device shown in FIG. 2A, in the first configuration.

FIGS. 2A and 2B show a medical device 200 in accordance with one or more embodiments of the present disclosure. The medical device 200 can be used in the preparation of a medicament prior to administration of the medicament. For example, the medical device 200 is a medicament vial holding device that may be used to retain two medicament vials in a manner which can assist a user in the preparation of a medicament using the medicament vials. The medicament device 200 may make handling of the medicament vials during a medicament preparation process easier, which not only may be beneficial for users that are relatively inexperienced with preparing a medicament (e.g., non-healthcare professionals), but may also be beneficial for healthcare professionals that may be repeatedly preparing a large number of medicament batches.

FIG. 2A shows the medical device 200 from above, while FIG. 2B is a side view of the medical device 200 shown in FIG. 2A.

The medical device 200 comprises a substantially planar tray 210 comprising a first tray portion 212, a second tray portion 214, and a hinge portion 216 pivotably coupling the first tray portion 212 to the second tray portion 214. FIGS. 2A and 2B show the tray 210 in a first configuration in which the first tray portion 212, hinge portion 216 and second tray portion 214 are extended substantially linearly along an axis B-B'.

In some examples, the first tray portion 212, the second tray portion 214 and the hinge portion 216 may be integrally formed. In such examples, the first tray portion 212, the second tray portion 214 and the hinge portion 216 may be formed from a single piece of material, for example a single piece of polymer material. The tray 210 may have been manufactured using thermoforming, injection moulding, or the like.

The first tray portion 212 comprises a first retainer 222 configured to retain a first medicament vial 232, wherein the first medicament vial 232 may be the same as or similar to the medicament vial 100 previously described in relation to FIG. 1.

The second tray portion 214 comprises a second retainer 224 configured to retain a second medicament vial 234, wherein the second medicament vial 234 may be the same as or similar to the medicament vial 100 described in relation to FIG. 1.

As shown in FIG. 2A, the first retainer 222 and the second retainer 224 are configured to hold their respective medicament vials 232, 234 simultaneously, and inhibit removal of the medicament vials 232, 234 from the respective first tray portion 212 and second tray portion 214 such that the medicament vials 232, 234 are securely held in their respective tray portions 212, 214. The first and second retainers 222, 224 are configured such that, when the medicament vials 232, 234 are retained in the respective retainers 222, 224 and the tray 210 is in the first configuration shown in FIGS. 2A and 2B, the longitudinal axis of each medicament vial 232, 234 is substantially parallel to the longitudinal axis B-B' of the tray 210. The first and second retainers 222, 224 are also configured such that, when the medicament vials 232, 234 are retained in the respective retainers 222, 224 and the tray is in the first configuration shown in FIGS. 2A and 2B, the cap 252 of the first medicament vial 232 faces the cap 254 of the second medicament vial 234 (if the medicament vials 232, 234 have caps 252, 254 attached, which may be similar or identical to cap 118 described in relation to FIG. 1), or the stopper 272 of the first medicament vial 232 faces the stopper 274 of the second medicament vial 234 (if the vials 232, 234 do not have caps 252, 254 attached, wherein the stoppers 272, 274 may be similar to stopper 112 described in relation to FIG. 1).

The tray 210 (e.g., the first and second retainers 222, 224) is configured such that, when the first medicament vial 232 and second medicament vial 234 are retained in the respective first retainer 222 and second retainer 224, a first medicament constituent contained in the first medicament vial 232 and a second medicament constituent contained in the second medicament vial 234 can be accessed by a user. That is, the first medicament vial 232 and second medicament vial 234 are retained in their respective retainers 222, 224 such that a user may access the first medicament constituent contained in the first medicament vial 232 and the second medicament constituent contained in the second medicament vial 234 without removing the first medicament vial 232 or second medicament vial 234 from its respective retainer 222, 224. If the medicament vials 232, 234 do not have respective caps 252, 254, then the retainers 222, 224 are configured such that the stopper 272, 274 of each medicament vial 232, 234 is accessible to the user such that they may pierce the stopper 272, 274 with a hollow needle to extract the medicament constituents contained with the medicament vials 232, 234 via the hollow needle and/or introduce medicament constituents into the medicament vials 232, 234 via the hollow needle. If the medicament vials 232, 234 have respective caps 252, 254 attached, then the retainers 222, 224 are configured such that the user can remove the caps 252, 254 while the medicament vials 232, 234 remain retained in their respective retainers 222, 224.

FIGS. 2A and 2B show the first retainer 222 comprising a recess 242 formed in an upper surface 213 of the first tray portion 212, the recess 242 configured to receive at least a portion of the first medicament vial 232 for retaining the first medicament vial 232. Similarly, FIGS. 2A and 2B show the second retainer 224 comprising a recess 244 formed in an upper surface 223 of the second tray portion 214, the recess 244 configured to receive at least a portion of the second medicament vial 234 for retaining the second medicament vial 234.

As shown in FIG. 2B, the first retainer 222 is configured such that the cap 252 of the first medicament vial 232 (if present) is accessible to a user while the first medicament vial 232 is retained in the first retainer 222, such that the cap 252 may be removed by the user while the first medicament vial 232 remains retained in the first retainer 222. This may be due to the recess 242 having a shape that allows for the cap 252 to be removed, for example. Similarly, as shown in FIG. 2B, the second retainer 224 is configured such that the cap 254 of the second medicament vial 234 (if present) is accessible to a user while the second medicament vial 234 is retained in the second retainer 224, such that the cap 254 may be removed by the user while the second medicament vial 234 remains retained in the second retainer 224. This may be due to the recess 244 having a shape that allows for the cap 254 to be removed, for example. If the caps 252, 254 have been removed or are not present, the stoppers 272, 274 of the medicament vials 232, 234 are accessible to the user while the medicament vials 232, 234 remain retained in their respective retainers 222, 224 (which may again be due to a shape of the recesses 242, 244, for example).

The first retainer 222 as shown in FIG. 2A may be configured to retain the first medicament vial 232 through a friction fit between the first retainer 222 and the first medicament vial 232, for example by a friction fit between the recess 242 and the first medicament vial 232. Similarly, the second retainer 224 as shown in FIG. 2A may be configured to retain the second medicament vial 234 through a friction fit between the second retainer 224 and the second medicament vial 234, for example by a friction fit between the recess 244 and the second medicament vial 234.

However, it should be understood that in one or more other embodiments, at least one of the first retainer 222 and the second retainer 224 may be configured to retain its respective medicament vial 232, 234 by other means than a friction fit. For example, in one or more other embodiments, at least one of the first retainer 222 and the second retainer 224 may be configured to retain its respective medicament vial 232, 234 through a snap fit. Alternative configurations for the first retainer 222 and/or the second retainer 224 for retaining the medicament vials 232, 234 are described later in relation to FIGS. 5 and 6.

As previously discussed, FIGS. 2A and 2B show the tray 210 in a first configuration, wherein the tray 210 is substantially flat, with the first tray portion 212 and second tray portion 214 arranged substantially linearly along the axis B-B'. A substantially flat lower surface 262 of the first tray portion 212 may be substantially coplanar with a substantially flat lower surface 264 of the second tray portion 214 when the tray 210 is in the first configuration, wherein the lower surface 262 of the first tray portion 212 is at an opposite side of the first tray portion 212 to the upper surface 213 of the first tray portion 212 and the lower surface 264 of the second tray portion 214 is at an opposite side of the second tray portion 214 to the upper surface 223 of the second tray portion 214.

The first configuration of the tray 210 may be considered an initial configuration, wherein the tray 210 may be provided to, or received by, a user in this first/initial configuration, prior to the preparation of a medicament using medicament constituents in the first and second medicament vials 232, 234. In some examples, the tray 210 may be provided to the user with one or both of the medicament vials 232, 234 already retained in their respective retainers 222, 224. For example, a third party such as a healthcare professional may have inserted the first medicament vial 232 into the first retainer 222 and/or the second medicament vial 234 into the second retainer 224 prior to the user receiving the tray 210. This may ensure the user is provided with the correct combination of medicament vials 232, 234, ready for mixing to form the final medicament. However, in other examples, the tray 210 may be provided to the user without the first medicament vial 232 in the first retainer 222 and without the second medicament vial 234 in the second retainer 224. In such examples, the user may themselves insert the first medicament vial 232 into the first retainer 222 and the second medicament vial 234 into the second retainer 224 so that they are retained by the retainers 222, 224.

The substantially flat nature of the medical device 200 when the tray 210 is in the first configuration may allow a plurality of the medical devices 200 to be stacked in a compact manner, for example during storage of a large number of medical devices 200 and medicament vials 232, 234 at a patient's home. In some examples, for example where the trays 210 have been injection moulded or thermoformed, the trays 210 may each have a shape that allows the trays 210 to be nested within each other in a particularly compact manner (for example, when the trays 210 and medicament vials 232, 234 are initially separate prior to use).

The first tray portion 212 and the second tray portion 214 have respective end surfaces 282, 284, the purpose of which is described later in relation to FIG. 3. When the tray 210 is in the first configuration shown in FIGS. 2A and 2B, the end surface 282 of the first tray portion 212 and the end surface 284 of the second tray portion 214 are located at opposite ends of the tray 210 along the axis B-B'.

Figure 3:
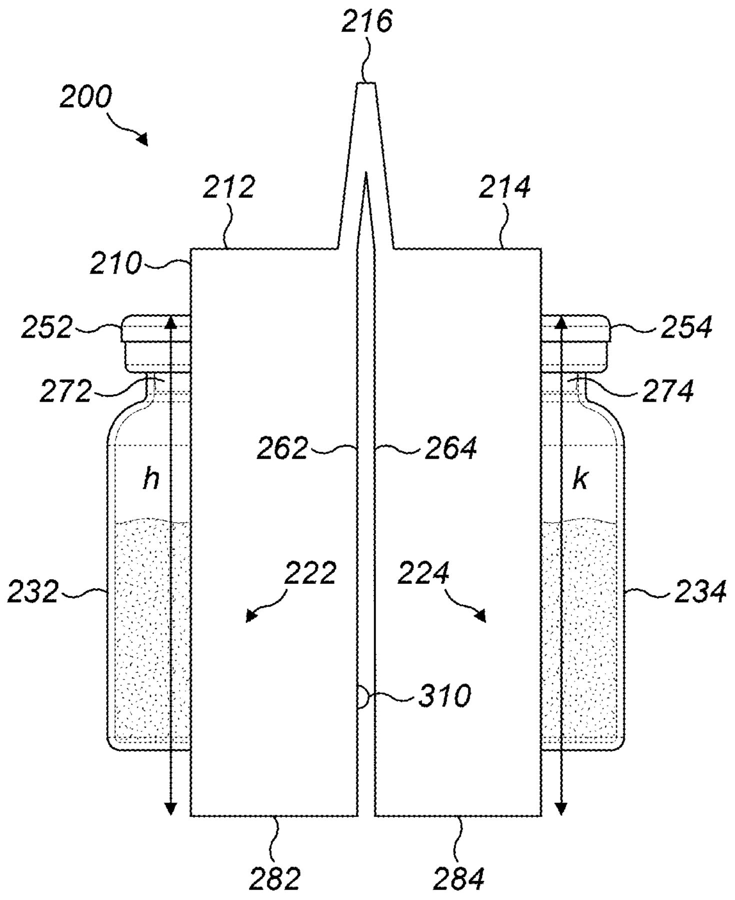
FIG. 3 shows a side view of the medical device of FIG. 2A, wherein the medical device is in a second configuration.

The first tray portion 212 and the second tray portion 214 are pivotably coupled such that the first tray portion 212 is pivotable relative to the second tray portion 214 to move the tray 210 from the first configuration shown in FIGS. 2A and 2B to a second configuration shown in FIG. 3. The second configuration can assist the user in a medicament preparation process, as later described.

To allow the first tray portion 212 to pivot relative to the second tray portion 214, the first tray portion 212 and the second tray portion 214 are pivotably coupled by the hinge portion 216 arranged between the first tray portion 212 and the second tray portion 214. When the first retainer 222 retains the first medicament vial 232 and the second retainer 224 retains the second medicament vial 234, the hinge portion 216 is arranged between the first medicament vial 232 and the second medicament vial 234 when the tray 210 is in the first configuration, as shown in FIGS. 2A and 2B. The hinge portion 216 is arranged such that the first tray portion 212 can pivot relative to the second tray portion 214 about an axis C-C', wherein the axis C-C' is substantially perpendicular to the axis B-B' and the longitudinal axis of each medicament vial 232, 234.

In some examples, the hinge portion 216 may comprise a living hinge that is integrally formed with the first tray portion 212 and the second tray portion 214 (for example, in cases where the first tray portion 212, second tray portion 214 and hinge portion 216 are thermoformed or injection moulded to from a single piece of material such as a suitable polymer).

FIG. 2A shows the hinge portion 216 comprising a linear perforation 217 extending across the tray 210, along axis C-C'. The linear perforation 217 separates the first tray portion 212 and the second tray portion 214 and may comprise a plurality of individual perforations arranged linearly. The linear perforation 217 may be configured to allow the first tray portion 212 and the second tray portion 214 to be pivotably rotated relative to one another about the linear perforation 217 and the axis C-C'.

It should be understood that in one or more other examples, the hinge portion 216 may take a different form to a linear perforation 217. For example, in one or more other examples the hinge portion 216 may comprise a strip of material coupled between the first tray portion 212 and the second tray portion 214 that is thinner, more flexible, and/or weakened in comparison to the adjacent portion of the first tray portion 212 and the adjacent portion of the second tray portion 214 to which it is coupled. Other suitable forms for the hinge portion 216 may be envisaged.

FIG. 3 shows the medical device 200 of FIGS. 2A and 2B once the tray 210 is in its second configuration. The second configuration may be considered a final configuration, wherein preparation of the medicament from the medicament constituents in the first medicament vial 232 and the second medicament vial 234 may be performed by a user while the tray 210 is in the second configuration.

A user may move the tray 210 from its first configuration to its second configuration by pivoting the first tray portion 212 relative to the second tray portion 214 about the hinge portion 216, about the axis B-B' shown in FIG. 2A. The first medicament vial 232 and the second medicament vial 234 may be retained in their respective retainers 222, 224 as the tray 210 is moved from its first configuration to its second configuration, with the first retainer 222 and second retainer 224 configured to inhibit the respective medicament vials 232, 234 from uncoupling from (e.g., falling out of) the retainers 222, 224 as the first tray portion 212 is pivoted relative to the second tray portion 214.

The tray 210 is configured such that, when the tray 210 is in the second configuration, the first medicament vial 232 and the second medicament vial 234 are retained in a substantially similar orientation, with the longitudinal axis of the first medicament vial 232 being substantially parallel to the longitudinal axis of the second medicament vial 234.

As shown in FIG. 3, when the tray 210 is in its second configuration, the cap 252 of the first medicament vial 232 (if present) and the cap 254 of the second medicament vial 234 (if present) both face in substantially the same direction and are simultaneously accessible to a user. This provides easy access for the user to remove the cap 252 of the first medicament vial 232 and the cap 254 of the second medicament vial 234, ready for accessing the medicament vial 232, 234 contents. Once the caps 252, 254 have been removed from the medicament vials 232, 234, or if the medicament vials 232, 234 do not have caps 252, 254, the upper surfaces of the stoppers 272, 274 of the medicament vials 232, 234 will both face in substantially the same direction and will be simultaneously accessible to the user, allowing the user to access the contents of the medicament vials 232, 234 through the stoppers 272, 274 with manual reconstitution supplies such as, but not limited to, a blunt fill needle or a vial spike.

As shown in FIG. 3, the end surface 282 of the first tray portion 212 and the end surface 284 of the second tray portion 214 are substantially co-planar when the tray 210 is in its second configuration, such that the end surface 282 of the first tray portion 212 and the end surface 284 of the second tray portion 214 together form a base for supporting the tray 210 in an upright position, as shown in FIG. 3, in which the caps 252, 254 and/or stoppers 272, 274 face upwards.

The first retainer 222 and second retainer 224 may be arranged such that a distance h between the cap 252/stopper 272 of the first medicament vial 232 and the base formed from the end surfaces 282, 284 is substantially equal to a distance k between the cap 254/stopper 274 of the second medicament vial 234 and the base formed from the end surfaces 282, 284, which may make access to the medicament vials 232, 234 easier for a user.

As shown in FIG. 3, the tray 210 may comprise a coupling arrangement 310 configured to retain the tray 210 in the second configuration by inhibiting a movement between the first tray portion 212 and the second tray portion 214, for example a rotation of the first tray portion 212 relative to the second tray portion 214 about the hinge portion 216.

Figure 4:
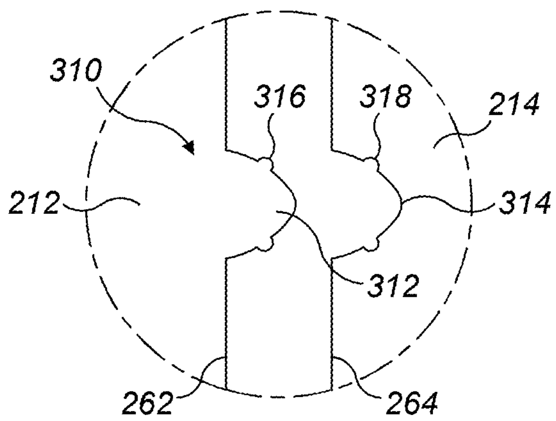
FIG. 4 shows a magnified view of a coupling arrangement of the medical device of FIG. 3.

FIG. 4 shows an example of the coupling arrangement 310 in greater detail. The coupling arrangement 310 may comprise a first coupling element 312 arranged at the first tray portion 212 and a second coupling element 314 arranged at the second tray portion 214. The first coupling element 312 and the second coupling element 314 are couplable to retain the tray 210 in the second configuration by retaining the first tray portion 212 and the second tray portion 214 in a fixed configuration once the first coupling element 312 and the second coupling element 314 are coupled. In some examples, the first coupling element 312 and the second coupling element 314 may be releasably couplable, such that the first coupling element 312 and the second coupling element 314 may be coupled and then uncoupled by a user. However, in other examples, the first coupling element 312 and the second coupling element 314 may be configured to be permanently coupled (i.e., once coupled, the first coupling element 312 and the second coupling element 314 cannot be uncoupled, perhaps without substantial effort by the user or destruction of the tray 210).

FIG. 4 shows the first coupling element 312 arranged at the lower surface 262 of the first tray portion 212 and the second coupling element 314 arranged at the lower surface 264 of the second tray portion 214, with the first coupling element 312 taking the form of a coupling projection configured to engage the second coupling element 314, which takes the form of a coupling recess. The coupling projection and coupling recess may be configured to couple by friction fit, or the coupling projection and/or coupling recess may comprise respective coupling features 316, 318 such as bumps, ribs or clips to assist with the coupling.

It should be understood that in other examples, the coupling arrangement 310 may take a different form to a coupling projection and coupling recess, such as, but not limited to, an adhesive coupling arrangement.

Figure 5:
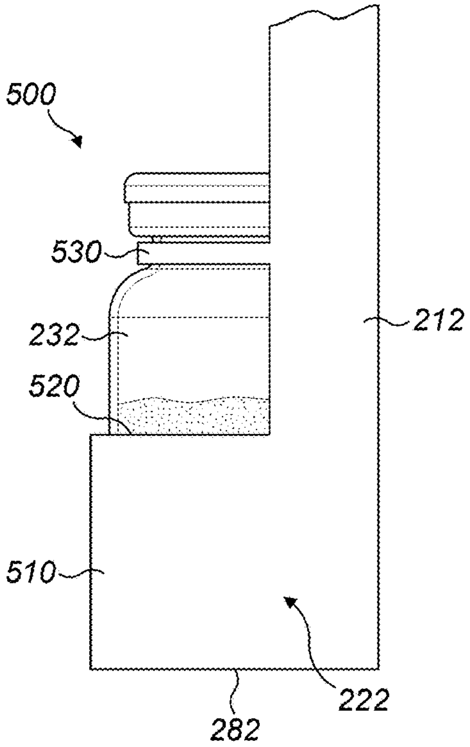
FIG. 5 shows a partial side view of a medical device according to one or more embodiments of the present disclosure, having a collar for retaining a medicament vial.

As previously described, the first retainer 222 and/or second retainer 224 may take a different form to that described in relation to FIGS. 2A and 2B. FIG. 5 shows such an alternative configuration of the first retainer 222, which may similarly apply to the second retainer 224.

FIG. 5 shows a portion of the first tray portion 212 of a medical device 500, wherein the medical device 500 may be similar or identical to the medical device 200, however the first retainer 222 of the medical device 500 comprises a collar 510 configured to receive at least a portion of the first medicament vial 232 (e.g., the body of the first medicament vial 232), to retain the first medicament vial 232 in the collar 510. FIG. 5 shows the collar 510 retaining a lower portion of the body of the first medicament vial 232. The collar 510 forms an aperture 520 through which the body of the first medicament vial 232 may be inserted. The collar 510 may be shaped to substantially correspond to a cross-section of the body of the first medicament vial 232 such that the first medicament vial 232 is gripped by an inner wall(s) of the collar 510.

In some examples, a friction fit between the collar 510 and the first medicament vial 232 may be sufficient to retain the first medicament vial 232 in the first retainer 222, for example while pivoting the tray 210 from the first configuration to the second configuration.

In some examples, as shown in FIG. 5, the first retainer 222 may further comprise a retention element 530 configured to receive a neck portion of the first medicament vial 232 to inhibit a movement of the first medicament vial 232 relative to the first tray portion 212 (e.g., to inhibit sliding of the first medicament vial 232 out of the collar 510). The retention element 530 may comprise a substantially arcuate arm or collar configured to engage the neck portion of the first medicament vial. The retention element 530 may at least partially circumferentially surround the neck portion of the first medicament vial 232 when the first medicament vial 232 is retained in the first retainer 222 such that movement of the body of the first medicament vial 232 out of the collar 510 is inhibited. The retention element 530 may be flexible to allow the first medicament vial 232 to be initially inserted into the first retainer 222 (e.g., to allow the body of the first medicament vial 232 to be inserted into the collar 510). For example, the retention element 530 may be formed of an elastic material.

Figure 6:
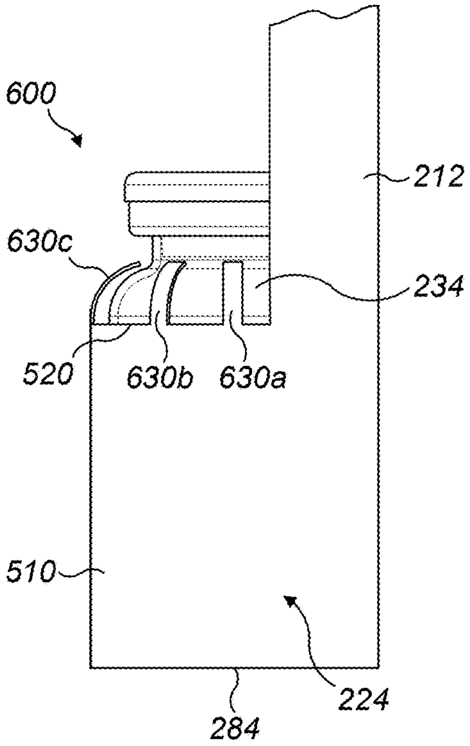
FIG. 6 shows a partial side view of a medical device according to one or more embodiments of the present disclosure, having flexible engagement elements for retaining a medicament vial.

FIG. 6 shows another alternative form of the first retainer 222. FIG. 6 shows a portion of the first tray portion 212 of a medical device 600, wherein the medical device 600 may be similar or identical to the medical device 500 described in relation to FIG. 5. FIG. 6 shows the first retainer 222 comprising a collar 510, which may be similar to the collar 510 described in relation to FIG. 5. However, in the embodiment shown in FIG. 6, the first retainer 222 further comprises at least one flexible engagement element 630*a-c* extending from the collar 510 and configured to engage with the first medicament vial 232 to retain the first medicament vial 232 within the collar 510. Three flexible engagement element 630*a-c* are visible in FIG. 6, with another three flexible engagement elements obscured by the neck portion of the first medicament vial 232. However, it should be understood that the number of flexible engagement elements 630*a-c* is not meant to be limiting and that in other examples the first retainer 222 may comprise any number from one to five flexible engagement elements, or greater than six flexible engagement elements.

The arm-like flexible engagement elements 630*a-c* are arranged circumferentially around the aperture 520 of the collar and each extend radially inwards from the collar 510, such that a free end of each flexible engagement element 630*a-c* can engage a portion of the first medicament vial 232 (e.g., the neck portion or body of the first medicament vial 232) when the first medicament vial 232 is retained in the first retainer 222. Engagement between the flexible engagement elements 630*a-c* and the first medicament vial 232 inhibits movement (e.g., translation) of the first medicament vial 232 out of the collar 510. The flexibility of the flexible engagement elements 630*a-c* may allow the first medicament vial 232 to be initially inserted into the first retainer 222 (e.g., to allow the body of the first medicament vial 232 to be inserted into the collar 510), wherein the free ends of the flexible engagement elements 630*a-c* may flex outwards in a radial direction as the first medicament vial 232 is inserted into the first retainer 222. For example, the flexible engagement elements 630*a-c* may be formed of an elastic material.

While FIGS. 5 and 6 have generally been described in relation to alternative forms of the first retainer 222, it should be understood that this is not meant to be limiting and that various aspects of the first retainer 222 and first medicament vial 232 described in relation to FIG. 5 and/or FIG. 6 may additionally or alternatively apply to the second retainer 224 and second medicament vial 234 described herein. In some examples, the first retainer 222 and second retainer 234 may take a substantially similar form (e.g., may both take a form having a collar 510 as described in relation to FIG. 5), however in other examples the first retainer 222 and second retainer 224 may take different forms (e.g., the first retainer 222 may comprise a collar 510 as described in relation to FIG. 5 while the second retainer 224 may instead comprise a recess 244 as described in relation to FIGS. 2A and 2B).

As shown in FIGS. 2A-2B and FIG. 3, the first medicament vial 232 and the second medicament vial 234 may have a substantially similar shape and/or size. However, it should be understood that in other examples, the shape and/or size of the first medicament vial 232 and the second medicament vial 234 may be substantially different. For example, in certain mixing scenarios in which a medicament contained in the first medicament vial 232 is to be diluted using a diluent contained in the second medicament vial 234, the first medicament vial 232 may have a different size and/or shape to the second medicament vial 234.

Figure 7:
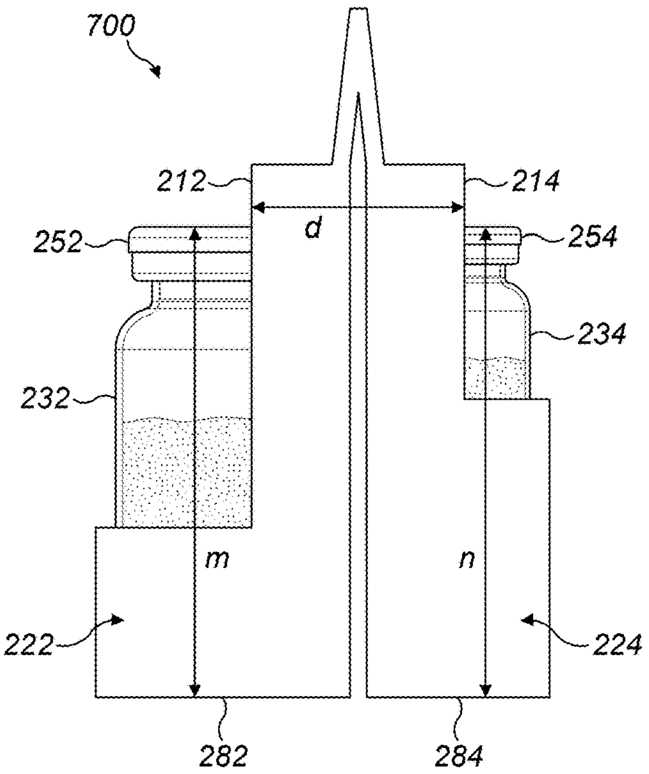
FIG. 7 shows a side view of an alternative medical device according to one or more embodiments of the present disclosure, in a second configuration.

FIG. 7 shows an example of a medical device 700, first medicament vial 232 and second medicament vial 234 which may be similar to the medical device 200, first medicament vial 232 and second medicament vial 234 described in relation to FIGS. 2A and 2B, however in this example the first medicament vial 232 and second medicament vial 234 are different sizes. More specifically, the first medicament vial 232 is substantially larger than the second medicament vial 234, having a height along its longitudinal axis that is substantially greater than an equivalent height of the second medicament vial 234 along its longitudinal axis. However, first retainer 222 and second retainer 224 are configured such that, when the medical device 700 is in its second configuration shown in FIG. 7, the caps 252, 254 (if present) lie in substantially a same plane and/or the stoppers 272/272 (if present) lie in substantially a same plane. That is, a distance m between the cap 252/stopper 272 of the first medicament vial 232 and the base formed from the end surfaces 282, 284 is substantially equal to a distance n between the cap 254/stopper 274 of the second medicament vial 234 and the base formed from the end surfaces 282, 284, which may make access to the medicament vials 232, 234 easier for a user. This may also be beneficial to minimize the movements needed during medicament manipulations involving the medicament vials 232, 234.

Additionally, in some examples, a perpendicular distance d between the longitudinal axes of the first medicament vial 232 and the second medicament vial 234 may substantially equal between two or more medical devices 700 as used for a series of similar medicament manipulations. That is, each medical device 700 of a plurality of medical device 700 may be configured such that both the height and center-to-center distance of the cap 252/stopper 272 and the cap 254/stopper 274 of the medicament vials 232, 234 are constrained to be substantially the same, even if each medicament device 700 is configured to receive differently sized or shaped medicament vials 232, 234 to the other medicament devices 700. The degree of constraint may correspond to, for example, the space required by a vial spike or automated device for manipulating the vials 232, 234 and their contents. The degree of constraint may also correspond to a predictable, predetermined distance required by another device interfacing with the present apparatus. This may be particularly advantageous if the medical device 700 is to be used by an automated device (e.g., machine) for preparing a medicament using the medicament vials 232, 234, rather than a human user.

According to one or more aspects of the present disclosure, a kit may be provided, wherein the kit comprises any medical device as disclosed herein (e.g., medical device 200, medical device 500, medical device 600, or medical device 700), any first medicament vial as disclosed herein (e.g., first medical vial 232), and optionally any second medicament vial as disclosed herein (e.g., second medical device 234). The kit may comprise the first medicament vial retained in a first retainer (e.g., first retainer 222) of the medical device, or the kit may comprise the first medicament vial separate from (i.e., not retained in) the first retainer. Similarly, if the kit comprises a second medicament vial, the second medicament vial may or may not be retained in a second retainer (e.g., second retainer 224) of the medical device.

Figure 8:
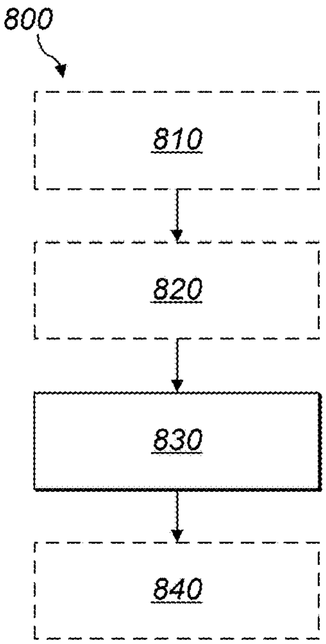
FIG. 8 is a flowchart illustrating a method according to one or more embodiments of the present disclosure.

FIG. 8 shows a flowchart illustrating a method 800 according to one or more aspects of the present disclosure, in which a medical device (e.g., medical device 200, medical device 500, medical device 600, or medical device 700) as described herein may be used to assist in the preparation of a medicament.

At optional step 810, a first medicament vial (e.g., first medical vial 232) is inserted into the first retainer (e.g., first retainer 222) of the first tray portion (e.g., first tray portion 212) of the medical device.

At optional step 820, a second medicament vial (e.g., second medicament vial 234) is inserted into the second retainer (e.g., second retainer 224) of the second tray portion (e.g., second tray portion 214) of the medical device.

If either medicament vial has a respective cap (e.g., cap 252 or cap 254) then this may be removed from the medicament vial prior to, or after, insertion of the medicament vial into the first or second retainer. In some examples, one or more of the first medicament vial or second medicament vial may already be present in its respective first retainer or second retainer, for example if the medical device has been previously prepared by a pharmacist or in a factory.

At step 830, the tray (e.g., tray 210) of the medical device is moved from its first configuration to its second configuration. A user may move the tray from its first configuration to its second configuration by rotating the first tray portion relative to the second tray portion, for example as previously described in relation to FIG. 3.

At optional step 840, and while the tray is in its second configuration, the user may transfer a first medicament constituent from the first medicament vial into the second medicament vial while the tray is in the second configuration. For example, the user may extract the first medicament constituent from the first medicament vial retained in the first retainer and introduce the first medicament constituent extracted from the first medicament container into the second medicament vial retained in the second retainer. Extracting the first medicament constituent may comprise piercing a stopper (e.g., stopper 272) of the first medicament vial with a hollow needle and extracting the first medicament constituent from the first medicament vial via the hollow needle (e.g., using a syringe). Introducing the first medicament constituent into the second medicament vial may comprise piercing a stopper (e.g., stopper 274) of the second medicament vial with a (same or different) hollow needle and introducing the first medicament constituent into the second medicament vial via the hollow needle (e.g., using a syringe).

The first retainer and second retainer are configured to hold the first medicament vial and the second medicament vial respectively while the tray is being moved from its first configuration to its second configuration. In some examples, the first retainer and second retainer may also be configured to hold the first medicament vial and the second medicament vial respectively while the tray and first and second medicament vials are inverted (e.g., inverted compared to FIG. 3) during withdrawal of a medicament constituent from one of the medicament vials, as may occur when withdrawing a medicament constituent into a syringe, for example.

While it has generally been described that one or more steps of method 800 are performed by a user, it should be understood that in one or more other examples, one or more of the steps of method 800 may be performed by an automated machine.

While one or more aspects of the present disclosure have been described in the context of preparing a medicament for IV administration, it should be understood that this is not meant to be limiting and that in other examples the one or more aspects may be used for the preparation of a medicament that is to be administered by a different route of administration than IV administration, for example, but not limited to, subcutaneous administration, oral administration, intraosseous administration, intratracheal administration, sublingual administration or nasal administration.

While one or more aspects of the present disclosure have been described in the context of the first medicament vial containing a first medicament constituent and the second medicament vial containing a second medicament constituent, it should be understood that this is not meant to be limiting and that in other examples one or both of the medicament vials may initially be empty (i.e., contain no medicament constituent) while retained in the medical device, with one or more medicament constituents added to one or both of the vials while the medical device is in the first configuration or second configuration.

In some examples, the term 'user' as used herein may refer to a patient to whom the medicament is to be administered. In other examples, the term 'user' may refer to a person other than the patient to whom the medicament is to be administered, for example a healthcare professional preparing the medicament for administration to the patient.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively, or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g., a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

Those of skill in the art will understand that modifications (additions and/or removals) of various components of the embodiments described herein may be made without departing from the full scope and spirit of the present invention, which encompass such modifications and any and all equivalents thereof.

LIST OF REFERENCE NUMBERS

100—medicament vial
101—circumferential outer surface
102—body
103—outlet
104—reservoir
105—end surface (of medicament vial)
106—medicament
108—neck portion
110—shoulder portion
112—stopper
114—flange
115—crimp cap
116—aperture
118—vial cap
200—medical device
210—tray
212—first tray portion
213—upper surface (of first tray portion)
214—second tray portion
216—hinge portion
217—linear perforation
222—first retainer
223—upper surface (of second tray portion)
224—second retainer
232—first medicament vial
234—second medicament vial
242—recess (of first tray portion)
244—recess (of second tray portion)
252—cap (of first medicament vial)
254—cap (of second medicament vial)
262—lower surface (of first tray portion)
264—lower surface (of second tray portion)
272—stopper (of first medicament vial)
274—stopper (of second medicament vial)
282—end surface (of first tray portion)
284—end surface (of second tray portion)
310—coupling arrangement
312—first coupling element
314—second coupling element
316—coupling features (of first coupling element)
318—coupling features (of second coupling element)
500—medical device
510—collar
520—aperture (of collar)
530—retention element
630*a,b,c*—flexible engagement elements
700—medical device
800—method
810—(first) method step
820—(second) method step
830—(third) method step
840—(fourth) method step

The invention claimed is:

1. A medical device for use in preparing a medicament, the medical device comprising:

a tray movable from a first configuration to a second configuration and comprising a first tray portion and a second tray portion, wherein the first tray portion comprises an upper surface, a bottom surface, and a first retainer on the upper surface of the first tray portion, the first retainer is configured to receive and retain a first medicament vial containing a first medicament constituent, wherein the second tray portion comprises an upper surface, a bottom surface, and a second retainer on the upper surface of the second tray portion, the second retainer is configured to receive and retain a second medicament vial containing a second medicament constituent, wherein the first tray portion and the second tray portion are pivotably coupled such that the first tray portion is pivotable relative to the second tray portion to move the tray from the first configuration to the second configuration, wherein the tray is configured such that, when the first medicament vial is retained in the first retainer and the second medicament vial is retained in the second retainer, the first medicament constituent and the second medicament constituent are accessible by a user, and wherein when the tray is in the first configuration, the bottom surface of the first tray portion is co-planar with the bottom surface of the second tray portion, and when the tray is in the second configuration, the bottom surface of the first tray portion is parallel to and faces the bottom surface of the second tray portion.

2. The medical device of claim 1, wherein the tray is configured such that, when the tray is in the first configuration and the first medicament vial is retained in the first retainer and the second medicament vial is retained in the second retainer, a longitudinal axis of the first medicament vial is substantially parallel to a longitudinal axis of the second medicament vial.

3. The medical device of claim 1, wherein, when the first medicament vial is retained in the first retainer and the second medicament vial is retained in the second retainer, the first tray portion is configured to pivot relative to the second tray portion about an axis that is substantially perpendicular to a longitudinal axis of the first medicament vial and a longitudinal axis of the second medicament vial.

4. The medical device of claim 1, wherein the first tray portion and the second tray portion are configured such that a stopper of the first medicament vial and a stopper of the second medicament vial are accessible when the tray is in the second configuration and the first medicament vial is retained in the first retainer and the second medicament vial is retained in the second retainer.

5. The medical device of claim 1, wherein each of the first tray portion and the second tray portion comprises an end surface, wherein the end surfaces are arranged such that, when the tray is in the second configuration, the end surfaces are substantially coplanar for supporting the tray.

6. The medical device of claim 1, wherein the tray comprises a coupling arrangement configured to retain the tray in the second configuration.

7. The medical device of claim 6, wherein the coupling arrangement comprises a first coupling element arranged at the first tray portion and a second coupling element arranged at the second tray portion, the first coupling element and the second coupling element couplable to retain the tray in the second configuration.

8. The medical device of claim 1, wherein the first retainer is configured to retain the first medicament vial through a friction fit or a snap fit.

9. The medical device of claim 1, wherein the first retainer comprises a recess formed in the upper surface of the first tray portion that is configured to receive a portion of the first medicament vial, and wherein the second retainer comprises a recess formed in the second tray portion that is configured to receive a portion of the second medicament vial.

10. The medical device of claim 1, wherein the first retainer comprises a collar configured to receive at least a portion of the first medicament vial to retain the first medicament vial.

11. The medical device of claim 10, wherein the first retainer comprises a retention element configured to receive a neck portion of the first medicament vial.

12. The medical device of claim 10, wherein the first retainer comprises at least one flexible engagement element extending from the collar and configured to engage with the first medicament vial to retain the first medicament vial within the collar.

13. The medical device of claim 1, wherein the first tray portion and the second tray portion are pivotably coupled by a hinge portion.

14. The medical device of claim 13, wherein the first tray portion, the second tray portion, and the hinge portion are integrally formed.

15. The medical device of claim 13, wherein the hinge portion comprises a linear perforation.

16. A method comprising:

moving a medical device from a first configuration to a second configuration, wherein the medical device comprises a first tray portion and a second tray portion pivotably coupled to the first tray portion, wherein the first tray portion comprises an upper surface, a bottom surface, and a first retainer on the upper surface of the first tray portion, and the second tray portion comprises an upper surface, a bottom surface, and a second retainer on the upper surface of the second tray portion, wherein each of the first retainer and the second retainer is configured to receive and retain a medicament vial;

while the medical device is in the second configuration:

extracting a first medicament constituent from a first medicament vial retained in the first retainer; and introducing the first medicament constituent extracted from the first medicament vial into a second medicament vial retained in the second retainer, wherein when the medical device is in the second configuration, the bottom surface of the first tray portion is parallel to and faces the bottom surface of the second tray portion.

17. The method of claim 16, comprising:

inserting a first medicament vial into a recess of the first retainer, wherein the recess is formed in the upper surface of the first tray portion; and inserting a second medicament vial into the second retainer.

* * * * *